United States Patent
Iyer et al.

(10) Patent No.: US 10,212,269 B2
(45) Date of Patent: Feb. 19, 2019

(54) MULTIFACTOR DRIVE MODE DETERMINATION

(71) Applicant: Motorola Mobility LLC, Libertyville, IL (US)

(72) Inventors: Boby Iyer, Elmhurst, IL (US); Gabriel J Dottl, Madison, WI (US); Atulkumar D Pandya, Hoffman Estates, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 253 days.

(21) Appl. No.: 14/103,899

(22) Filed: Dec. 12, 2013

(65) Prior Publication Data
US 2015/0126170 A1 May 7, 2015

Related U.S. Application Data

(60) Provisional application No. 61/900,990, filed on Nov. 6, 2013.

(51) Int. Cl.
*H04M 1/725* (2006.01)
*H04M 1/60* (2006.01)

(52) U.S. Cl.
CPC ..... *H04M 1/72577* (2013.01); *H04M 1/6091* (2013.01); *H04M 1/72563* (2013.01);
(Continued)

(58) Field of Classification Search
CPC ......... H04M 1/72577; H04M 1/72572; H04M 1/72569; H04M 1/72563; H04M 1/6091;
(Continued)

(56) References Cited

U.S. PATENT DOCUMENTS 6,353,778 B1 3/2002 Brown
7,292,152 B2 11/2007 Torkkola et al.
(Continued)

FOREIGN PATENT DOCUMENTS

| CN | 101374169 A | 2/2009 |
|----|-------------|--------|
| CN | 103108075 A | 5/2013 |

(Continued)

OTHER PUBLICATIONS

Invitation to Pay Additional Fees of international application No. PCT/US2014/064099, dated Feb. 6, 2015, 6 pp.
(Continued)

*Primary Examiner* — Charles Appiah
*Assistant Examiner* — Edward Zhang
(74) *Attorney, Agent, or Firm* — Shumaker & Sieffert, P.A.

(57) ABSTRACT

A system and method of determining whether a device user is driving provide an improved ability to switch between a normal mode and a driving mode with fewer false positives and false negatives. Bluetooth connectivity and motion sensor readings are fused to make the drive mode determination and to set the timing of nay switch. In an embodiment, Bluetooth devices correlated with driving are used to modify the confidence level and the decision threshold associated with sensor input. When a node having a driving correlation higher than a particular threshold is connected to a device, a lower threshold is applied to the motion sensor input for entering drive mode and a higher threshold is applied for exiting drive mode. Similarly, when a user device is not connected to any highly correlated node, default thresholds may be used for entering and exiting the drive mode.

15 Claims, 5 Drawing Sheets

(52) U.S. Cl.
CPC ... *H04M 1/72569* (2013.01); *H04M 1/72572* (2013.01); *H04M 2250/02* (2013.01); *H04M 2250/10* (2013.01); *H04M 2250/12* (2013.01)

(58) Field of Classification Search
CPC ......... H04M 2250/02; H04M 2250/10; H04M 2250/12; H04W 52/285; H04W 8/16
See application file for complete search history.

(56) References Cited

U.S. PATENT DOCUMENTS

| | | | |
|---|---|---|---|
| 7,876,205 B2 | 1/2011 | Catten et al. | |
| 8,000,689 B2 | 8/2011 | Featherstone et al. | |
| 8,213,962 B2* | 7/2012 | Carr | H04B 5/0031 455/26.1 |
| 8,401,578 B2 | 3/2013 | Inselberg | |
| 8,478,306 B2 | 7/2013 | Zheng | |
| 8,577,703 B2 | 11/2013 | McClellan et al. | |
| 9,037,125 B1 | 5/2015 | Kadous | |
| 9,037,199 B1 | 5/2015 | Stogaitis et al. | |
| 9,042,872 B1 | 5/2015 | Breed et al. | |
| 9,571,629 B2 | 2/2017 | Kadous | |
| 2001/0006886 A1 | 7/2001 | Suzuki | |
| 2001/0040590 A1 | 11/2001 | Abbott et al. | |
| 2003/0109246 A1 | 6/2003 | Shimizu et al. | |
| 2005/0119002 A1 | 6/2005 | Bauchot et al. | |
| 2005/0255874 A1 | 11/2005 | Stewart-Baxter et al. | |
| 2006/0148490 A1* | 7/2006 | Bates | H04W 48/02 455/456.1 |
| 2006/0273888 A1 | 12/2006 | Yamamoto | |
| 2008/0299954 A1* | 12/2008 | Wright | H04W 4/02 455/414.1 |
| 2009/0002147 A1 | 1/2009 | Bloebaum et al. | |
| 2009/0048944 A1 | 2/2009 | Eagle | |
| 2009/0111422 A1 | 4/2009 | Bremer et al. | |
| 2009/0132197 A1* | 5/2009 | Rubin | H04M 1/72563 702/141 |
| 2010/0148920 A1 | 6/2010 | Philmon et al. | |
| 2010/0216509 A1* | 8/2010 | Riemer | H04M 1/72577 455/557 |
| 2010/0255778 A1 | 10/2010 | Lovell et al. | |
| 2011/0059731 A1 | 3/2011 | Schivley | |
| 2011/0212737 A1 | 9/2011 | Isidore | |
| 2011/0219080 A1 | 9/2011 | McWithey et al. | |
| 2011/0275321 A1* | 11/2011 | Zhou | H04M 1/6091 455/41.2 |
| 2012/0250517 A1 | 10/2012 | Saarimaki et al. | |
| 2012/0265977 A1 | 10/2012 | Ewell, Jr. et al. | |
| 2012/0329444 A1 | 12/2012 | Osann, Jr. | |
| 2013/0035117 A1 | 2/2013 | Litkouhi et al. | |
| 2013/0041521 A1 | 2/2013 | Basir et al. | |
| 2013/0150004 A1 | 6/2013 | Rosen | |
| 2013/0245986 A1* | 9/2013 | Grokop | H04M 1/72569 702/141 |
| 2013/0281079 A1 | 10/2013 | Vidal et al. | |
| 2013/0303143 A1* | 11/2013 | Schrader | H04M 1/72577 455/418 |
| 2013/0332160 A1 | 12/2013 | Posa | |
| 2014/0002357 A1 | 1/2014 | Pombo et al. | |
| 2014/0113619 A1 | 4/2014 | Tibbitts et al. | |
| 2014/0187219 A1 | 7/2014 | Yang et al. | |
| 2014/0192781 A1* | 7/2014 | Teyeb | H04W 36/34 370/331 |
| 2014/0195125 A1 | 7/2014 | Siegel et al. | |
| 2014/0256303 A1 | 9/2014 | Jones | |
| 2014/0342718 A1 | 11/2014 | Chen et al. | |
| 2014/0375477 A1 | 12/2014 | Jain et al. | |
| 2015/0024786 A1* | 1/2015 | Asrani | H04W 4/008 455/456.4 |
| 2015/0181414 A1 | 6/2015 | Bretscher et al. | |
| 2015/0185827 A1 | 7/2015 | Sayed | |
| 2015/0213555 A1 | 7/2015 | Barfield et al. | |
| 2015/0288804 A1 | 10/2015 | Kadous | |
| 2015/0312404 A1 | 10/2015 | Abramson et al. | |
| 2016/0021238 A1 | 1/2016 | Abramson et al. | |
| 2016/0249191 A1 | 8/2016 | Avrahami et al. | |
| 2017/0126880 A1 | 5/2017 | Kadous | |

FOREIGN PATENT DOCUMENTS

| | | |
|---|---|---|
| WO | 2012170366 A1 | 12/2012 |
| WO | 2013040493 A1 | 3/2013 |
| WO | 2014035940 A2 | 3/2014 |

OTHER PUBLICATIONS

International Search Report and Written Opinion of international application No. PCT/US2014/064099, dated Apr. 30, 2015, 19 pp.
Using Mobile Phones to Determine Transportation Modes, Reddy et al., http://www.cs.cornell.edu/~destrin/resources/journals/2010-feb-Reddy-Transportation-Modes.pdf, Feb. 2010, pp. 13.6-13.7.
International Preliminary Report on Patentability from International Application No. PCT/US2014/064099, dated May 19, 2016, 13 pp.
Gordon-Bloomfield, "Testa Model S+ Pebble SmartWatch=Tesla Awesomeness on Your Wrist", Transport Evolved [online]. Feb. 26, 2014. Retrieved from the Internet: <http://transportevolved.com/2014/02/26/tesla-model-s-pebble-smartwatch-tesla-awesomeness-on-your-wrist/> 2 pgs.
Griffiths, "Now Nissan jumps on the smartwatch bandwagon: Wearable tech monitors the performance of the car and its driver," Daily Mail [online]. Sep. 9, 2013. Retrieved from the Internet: http://www.dailymail.co.uk/sciencetech/article-2415943/Now-NISSAN-jumps-smartwatch-bandwagon-Wearable-tech-monitors-performance-car-driver.html, 3 pgs.
Krause et al., "Context-Aware Mobile Computing: Learning Context-Dependent Personal Preferences from a Wearable Sensor Array," IEEE Transactions on Mobile Computing, vol. 5, No. 2, Feb. 28, 2006, 15 pp.
U.S. Appl. No. 14/246,966, filed Apr. 7, 2014 by Mohammed Waleed Kadous.
Notice of Intent to Grant and Text Intended to Grant from counterpart European Application No. 14802297.3, dated Jul. 17, 2017, 25 pp.
First Office Action and Search Report, and translation thereof, from counterpart Chinese Application No. 201480060949.9, dated Jul. 4, 2018, 13 pp.

* cited by examiner

MULTIFACTOR DRIVE MODE DETERMINATION

The present application is related to and claims priority to provisional U.S. patent application Ser. No. 61/900,990, filed Nov. 6, 2013, which is herein incorporated by reference for all that it teaches and discloses.

TECHNICAL FIELD

The present disclosure is related generally to mobile device configuration for driving and, more particularly, to a system and method for entering and exiting a driving mode based on a plurality of factors.

BACKGROUND

The use of mobile devices has become commonplace, and for many people, having access to their mobile device during all hours of the day is important or even critical. However, there are still situations wherein the overall user experience is improved by not allowing full access to such devices. For example, many theater goers prefer that the theater take steps to limit the use of mobile phones during movie showings. Moreover, many hospitals prohibit mobile phone use on their premises or at least in certain areas. While there is still much debate over the extent to which users need mobile device access during movies or at the hospital, most people do agree that mobile phone use should be limited when the user is driving a vehicle.

Many states have adopted measures to limit mobile phone use while driving, but technical measures may also be appropriate where legal measures are not widely followed or enforced. One possible technical measure is to detect the proximity of a user's device to a user's vehicle, and to base the level of access on that proximity. For example, if a user's device is within Bluetooth range of the vehicle's wireless system, the user may be deemed to be driving the vehicle, and access to the mobile device may be limited. Similarly, the motion and location detection facilities of the device may be used to infer that the device is moving in a vehicle.

However, these types solutions, while potentially effective, would present the possibility of a significant number of false positives (e.g., determining that the user is driving when they are not) and false negatives (determining that the user is not driving when I fact they are). A false positive determination may serve to limit device access when the user is walking or sitting in their office, while a false negative may allow full device access while the user is driving.

Before moving to other portions of this description, it is noted that the present disclosure is directed to a system that may exhibit improvements over some prior systems. However, it should be appreciated that any such improvements are not limitations on the scope of the disclosed principles nor of the attached claims, except to the extent expressly noted to be critical. Additionally, the foregoing discussion of problems and potential solutions is merely a result of the inventors' thoughtful consideration, and is not presented as, nor intended to represent, prior art.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
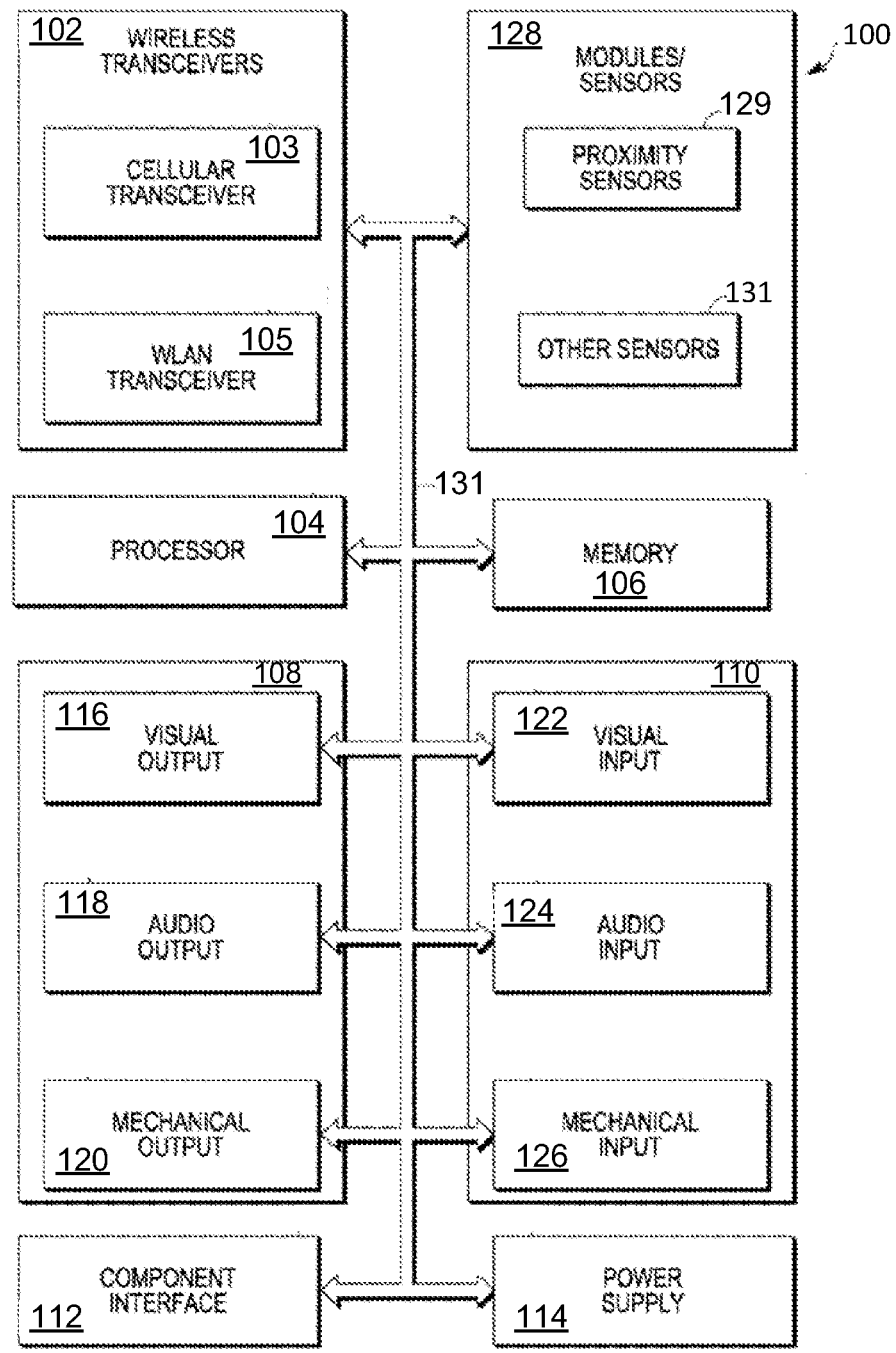
FIG. 1 is a generalized schematic of an example device within which the presently disclosed innovations may be implemented.

Turning to the drawings, wherein like reference numerals refer to like elements, techniques of the present disclosure are illustrated as being implemented in a suitable environment. The following description is based on embodiments of the disclosed principles and should not be taken as limiting the claims with regard to alternative embodiments that are not explicitly described herein.

In general terms, the described principles enable an improved determination as to whether a device user is driving, resulting in an improved ability to switch between a normal mode and a driving mode with fewer false positives and false negatives. In particular, instead of relying on either Bluetooth detection or motion sensor readings alone for entering the drive mode, the described sensor fusion technique selectively uses aspects of both input types to improve the drive mode determination.

In general nonlimiting terms, the disclosed principles detect Bluetooth devices correlated with driving (also referred to as highly correlated Bluetooth devices) and also detect motion attributes correlated with driving. The confidence level of each correlation is used to reduce the decision threshold associated with the other input. For example, when a node has a driving correlation higher than a particular threshold is connected to a device, a lower threshold is applied to the motion sensor input for entering drive mode and a higher threshold is applied for exiting drive mode. Similarly, when a user device is not connected to any highly correlated node, default thresholds may be used for entering and exiting the drive mode.

Turning now to a more detailed description in view of the attached figures, the schematic diagram of FIG. 1 shows an example device within which aspects of the present disclosure may be implemented. In particular, the schematic diagram 100 illustrates exemplary internal components of a mobile smart phone implementation of a small mobile device. In the illustrated example, these components include wireless transceivers 102, a processor 104, a memory 106, one or more output components 108, one or more input components 110, and one or more sensors (especially including, in an embodiment one or more accelerometers 128). The processor 104 may be any of a microprocessor, microcomputer, application-specific integrated circuit, and so on. Similarly, the memory 106 may, but need not, reside on the same integrated circuit as the processor 104.

The device can also include a component interface 112 to provide a direct connection to auxiliary components or accessories for additional or enhanced functionality, and a power supply 114, such as a battery, for providing power to the device components. All or some of the internal components may be coupled to each other, and may be in communication with one another, by way of one or more internal communication links 131, such as an internal bus.

The memory 106 can encompass one or more memory devices of any of a variety of forms, such as read-only memory, random access memory, static random access memory, dynamic random access memory, etc., and may be used by the processor 104 to store and retrieve data. The data that is stored by the memory 106 can include one or more operating systems and/or applications as well as informational data. Each operating system is implemented via executable instructions stored in a storage medium in the device that controls basic functions of the electronic device, such as interactions among the various internal components, communications with external devices via the wireless transceivers 102 and/or the component interface 112, and storage and retrieval of applications and data to and from the memory 106.

With respect to programs, sometimes also referred to as applications, each program is implemented via executable code that utilizes the operating system to provide more specific functionality, such as file system service and handling of protected and unprotected data stored in the memory 106. Many such programs govern standard or required functionality of the small touch screen device. Other applications that provide optional or specialized functionality may be provided by third party vendors or the device manufacturer.

Finally, with respect to informational data, this non-executable information can be referenced, manipulated, or written by an operating system or program for performing functions of the device. Such informational data can include, for example, data that is preprogrammed into the device during manufacture, or any of a variety of types of information that may be uploaded to, downloaded from, or otherwise accessed at servers or other devices with which the device is in communication during its ongoing operation.

The device can be programmed such that the processor 104 and memory 106 interact with the other components of the device to perform a variety of functions. The processor 104 executes programs for providing different functions and activities such as launching applications, executing data transfer functions, and toggling through various graphical user interface objects (e.g., toggling through various icons that are linked to executable applications).

In the illustrated example, the wireless transceivers 102 include both a cellular transceiver 103 and a wireless local area network (WLAN) transceiver 105, e.g., for WiFi communications. Each of the wireless transceivers 102 utilizes a wireless technology for communication, such as cellular-based communication technologies including analog communications (using AMPS), digital communications (using CDMA, TDMA, GSM, iDEN, GPRS, EDGE, etc.), and next generation communications (using UMTS, WCDMA, LTE, IEEE 802.16, etc.) or variants thereof, or peer-to-peer or ad hoc communication technologies such as HomeRF, Bluetooth and IEEE 802.11 (a, b, g or n), or other wireless communication technologies.

Exemplary operation of the wireless transceivers 102 in conjunction with other internal components of the device can take a variety of forms and can include, for example, operation in which, upon reception of wireless signals, the internal components detect communication signals and one of the transceivers 102 demodulates the communication signals to recover incoming information, such as voice and/or data, transmitted by the wireless signals. After receiving the incoming information from the one of the transceivers 102, the processor 104 formats the incoming information for the one or more output components 108. Likewise, for transmission of wireless signals, the processor 104 formats outgoing information, which can or cannot be activated by the input components 110, and conveys the outgoing information to one or more of the wireless transceivers 102 for modulation as communication signals.

The output components 108 illustrated in the example of FIG. 1 include a variety of visual, audio, and/or mechanical outputs. For example, the output components 108 can include one or more visual output components 116 such as a display screen. One or more audio output components 118 can include a speaker, alarm, and/or buzzer, and one or more mechanical output components 120 can include a vibrating mechanism for example. Similarly, the input components 110 can include one or more visual input components 122 such as an optical sensor of a camera, one or more audio input components 124 such as a microphone, and one or more mechanical input components 126 such as a touch detecting surface and a keypad.

As noted above, mobile communications devices such as those described by way of example in FIG. 1, are generally usable wherever the user may be. However, such devices as discussed herein are configured to provide a driving mode of operation wherein access to the device's capabilities may be limited and non-tactile and nonvisual modes of interaction may be enhanced. For example, while in the drive mode, the device may convey texts via an audible announcement rather than a visual representation. Similarly, tactile input may be disabled, with only verbal input being usable to provide input to the device.

An aspect of supporting a driving mode is supporting the ability to switch in and out of the driving mode accurately. The disclosed principles use a form of sensor fusion to correlate various inputs with driving to enable better decisions as to when the user is or is not driving a vehicle.

Figure 2:
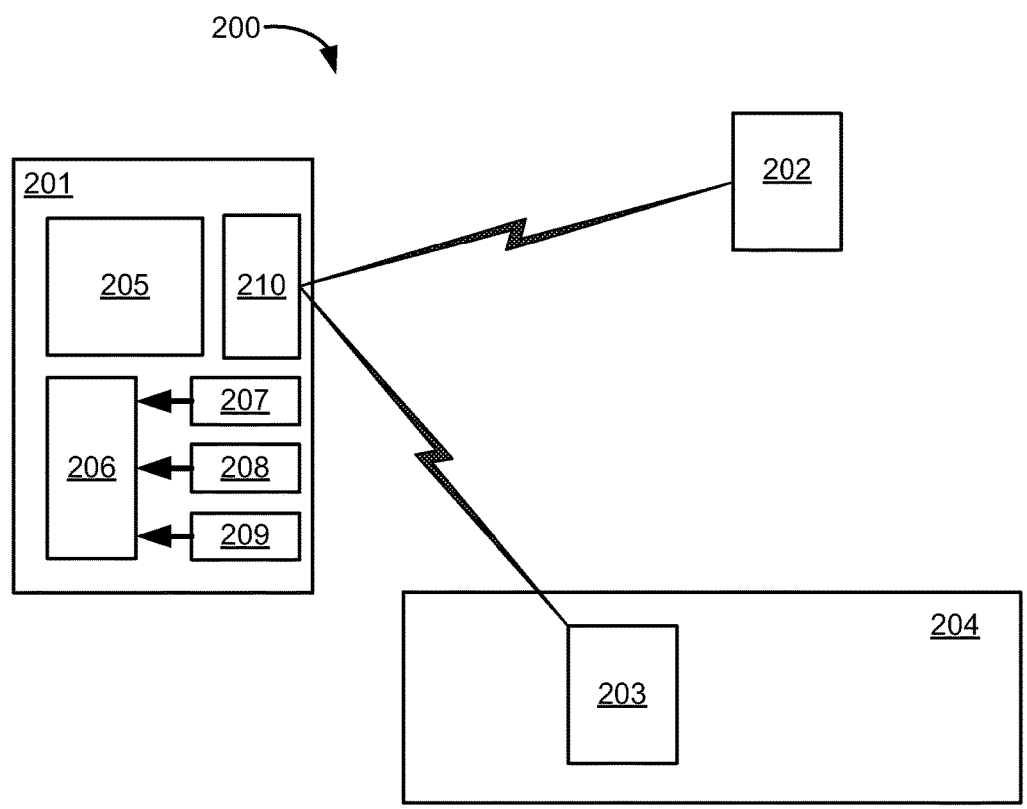
FIG. 2 is a simplified plan view of a representative environment in which the presently disclosed techniques may be practiced.

In order to understand the inputs that the device may receive, FIG. 2 is a simplified schematic showing a potential operating environment for a device implementing the disclosed principles. The illustrated example environment 200 includes the device itself 201 as well as a first Bluetooth node 202 and a second Bluetooth node 203. The second Bluetooth node 203 is affixed to or within a vehicle 204.

The device includes a drive mode determination module 205 as well as a sensor hub 206 for receiving sensor input from a plurality of driving-related sensors 207, 208, 209. The driving-related sensors 207, 208, 209 may include such things as an accelerometer, a gyroscope, GPS sensors, noise sensors, and so on. The device further includes a network communications module 210 for linking to available Bluetooth nodes.

In the illustrated figure, the device 201 is shown to be within range of both the first Bluetooth node 202 and the second Bluetooth node 203. The first Bluetooth node 202 is not correlated with driving, and may be, for example, a node in an office or home, while the second Bluetooth node 203 is within vehicle 204 and is strongly correlated with driving. While the correlation may be made in any of a number of ways, in an embodiment the correlation value for a node is based on past history of the simultaneous appearance of a connection with that node as well as indicia of driving from the sensor hub. Thus, for example, if there are indicia of driving from the sensor hub 206 a predetermined percentage of the time that a connection to that node appears, the correlation of the node with driving may be deemed to be high. The quantization of correlation may be by way of a percentage, a fraction, a raw value within a known range, etc. The process of utilizing correlation values to enter or exit the driving mode will be discussed below after a short discussion of an alternative operating environment with respect to FIG. 3.

Figure 3:
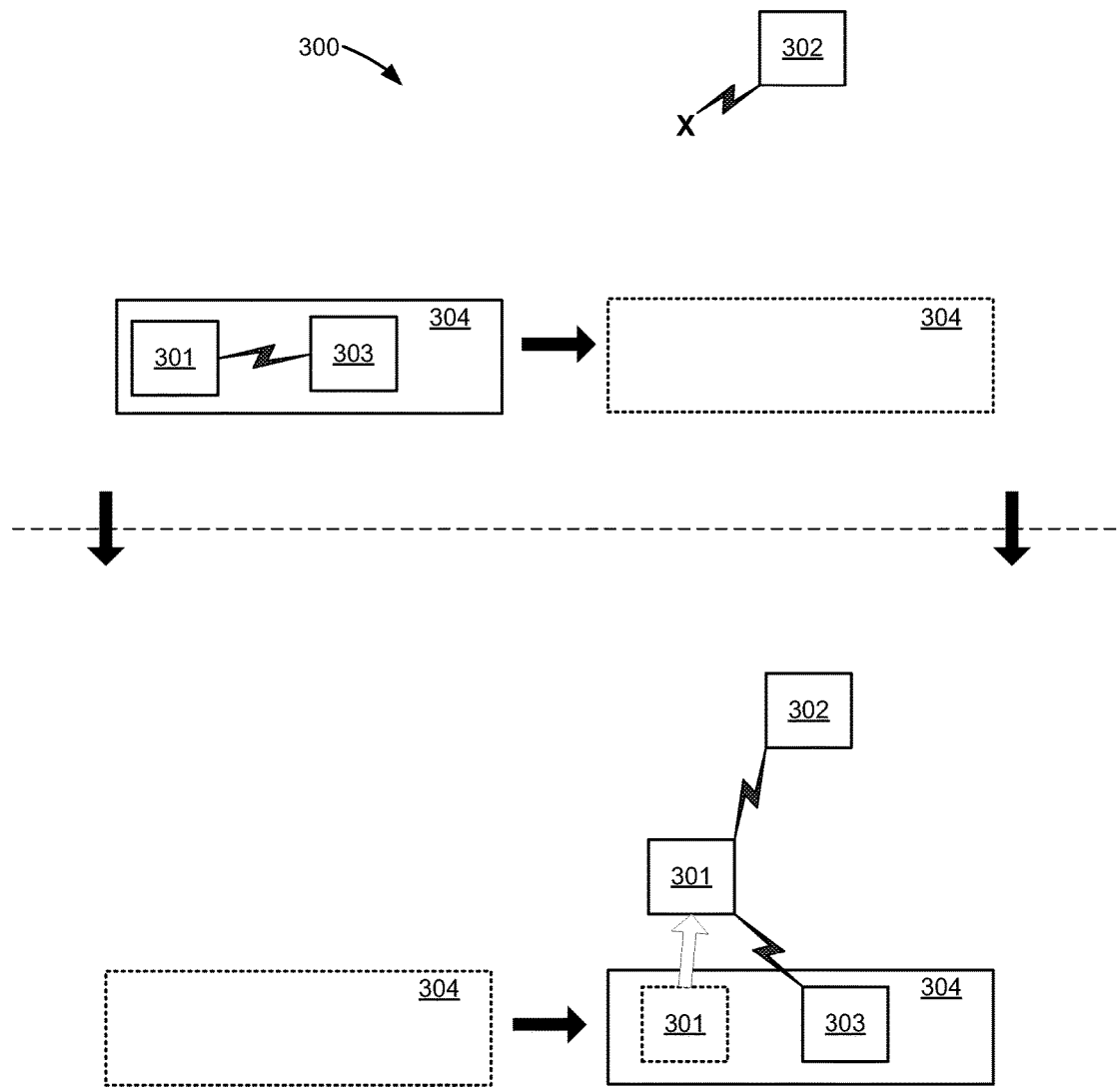
FIG. 3 is a simplified plan view of an alternative representative environment in which the presently disclosed techniques may be practiced.

The simplified plan view of FIG. 3 shows an example environment 300 wherein the mobile user device 301 is initially within the vehicle 304 in communication with the second Bluetooth node 303, and later exits the vehicle 304, maintaining the connection with the second Bluetooth node 303 but also acquiring a connection to the first Bluetooth node 302.

In this case, the high correlation of the device 301 with driving may be overcome by the lack of driving indicia from the sensor hub. In addition, the connection between the device 301 and the first Bluetooth node 302, which is a fixed node as opposed to a mobile node, is used in an embodiment of the disclosed principles to infer that the user associated with the device 301 is no longer driving, and that the device should exit the driving mode.

Figure 4:
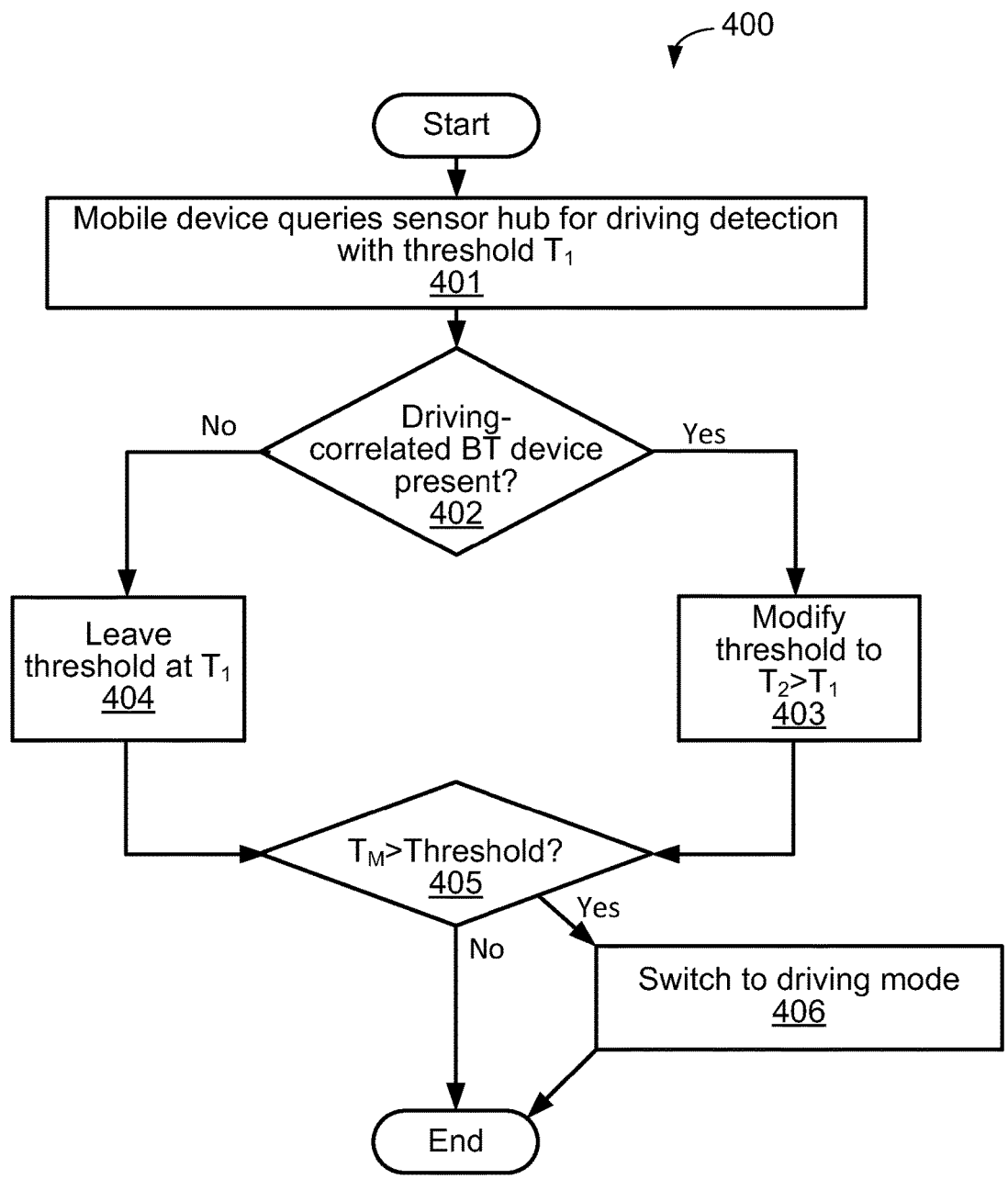
FIG. 4 is a flow chart illustrating a process of entering a driving mode in keeping with an embodiment of the disclosed principles.

The processes underlying the described sensor fusion within the context of the illustrated device and network systems and similar devices and systems may be implemented in various different ways. However, an exemplary process 400 for drive mode determination is shown in FIG. 4.

At the outset of the illustrated process, the mobile device is not in drive mode. At stage 401, the device queries the sensor hub to determine whether to switch into drive mode based on a first drive mode threshold value $T_1$. However, if at stage 402 a driving correlated Bluetooth system (such as an in-car system) is sensed, the drive mode threshold is changed to a second drive mode threshold value $T_2$ at stage 403, wherein the second drive mode threshold value $T_2$ is lower than the first drive mode threshold value $T_1$. If instead at stage 402 such a system is not detected, then the process flows to stage 404, wherein the driving mode threshold remains at $T_1$.

From either of stages 403 or 404, the process flows to stage 405. At this stage, collected driving-related data having a sensor-based value $T_m$ is compared to the threshold as it is currently set after the relevant one of stages 403 and 404. Possible sensor-based values include recent acceleration and speed or a value derived from recent acceleration and speed for example. The value $T_m$ may be as simple as a weighted or normalized combination of acceleration and speed, e.g., with higher weighting applied to the sensed speed since users can provide high acceleration but can only provide low overall speed on their own. Alternatively, the value $T_m$ may be derived from a lesser or greater number of parameters and may be calculated in a simpler or more complex fashion.

In any case, if the value $T_m$ is greater than the current threshold value ($T_1$ or $T_2$), then the process 400 flows to stage 406, wherein the device switches to drive mode. Otherwise, the process simply terminates after stage 405. It will be appreciated that the process 400 may be repeated at a desired interval or upon a predetermined trigger event or condition such that the driving mode status remains appropriate given current conditions.

In an embodiment, a delay is applied, with or without a change in threshold, to recognize the proximity of the driving-correlated Bluetooth system. For example, a delay of 10 seconds to switch into or out of the driving mode may or may not be shortened to 5 seconds depending on whether the driving-correlated Bluetooth system is or is not detected, respectively.

Figure 5:
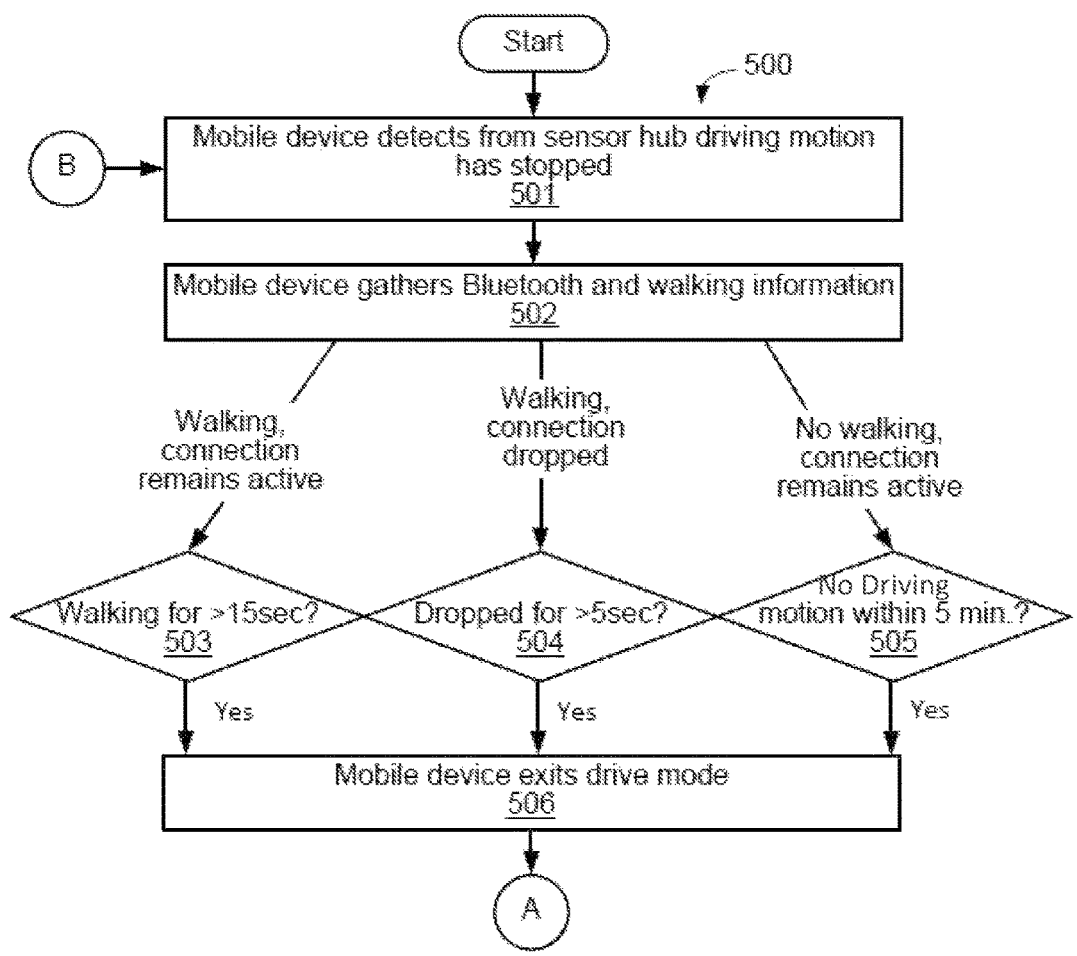
FIG. 5 is a flow chart illustrating a process of exiting a driving mode in keeping with an embodiment of the disclosed principles.

As noted above, in addition to determining when to enter the drive mode, the mobile device is also configured to determine when to exit the drive mode, again based on sensor fusion. An exemplary process for determining whether to exit the drive mode is shown in FIG. 5. The device is assumed to be in the drive mode at the outset of the process 500, e.g., the mobile device is in a vehicle with a user driving the vehicle.

At stage 501 of the process 500, the mobile device detects from the sensor hub that driving motion has stopped. The device then gathers data at stage 502 including (1) whether the Bluetooth connection to the vehicle Bluetooth system has dropped, and (2) whether a walking motion is detected. The status of the Bluetooth connection is used in this embodiment to reduce the wait time before exiting the drive mode in certain circumstances.

If the connection remains active but walking is detected, then the device waits for 15 seconds at stage 503. If walking continues and the connection remains active during the wait period, then the device exits the drive mode at stage 506. If instead walking is detected but the Bluetooth connection has dropped, then the device waits for a shorter time, such as 5 seconds at stage 504, and if the connection remains dropped, exits the drive mode at stage 506. If the device does not detect walking and the Bluetooth connection remains active, then the device waits a backup period such as 5 minutes, at stage 505 for driving to resume. If driving does not resume, the device exits the drive mode at stage 506. In each of stages 503-505, if the stated conditions do not continue to hold, the process 500 reverts to stage 501.

It will be appreciated that for the sake of clarity and brevity, not all cases are covered in the figure, but that other cases may be added as desired. For example, if there is no walking detected and the Bluetooth connection has dropped, then the mobile device may, for example, exit drive mode after a short delay, rather than waiting out a longer delay, when there is an active Bluetooth connection.

It will be appreciated that the processor of the mobile device executes the steps described as occurring at the mobile device. In this regard, the processor is considered to be configured to execute such steps by virtue of its access to computer-readable instructions that dictate such steps. The memory containing such instructions is a nontransitory computer-readable memory and the instructions include computer-executable instructions.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
    determining, by a mobile device, a first status of the mobile device, wherein the first status is one of driven or not driven;
    collecting, by the mobile device, sensor data generated by one or more sensors of the mobile device;
    determining, by the mobile device and based on a status of a connection between the mobile device and a wireless node and the sensor data, a second status of the mobile device as driven or not driven, wherein the sensor data includes one or more of accelerometer data, gyroscopic data and global positioning system data, and wherein the wireless node is a Bluetooth node;

determining, by the mobile device, whether the second status of the mobile device is different from the first status of the mobile device; and responsive to determining that the second status of the mobile device is different from the first status of the mobile device and after a wait period has elapsed, switching, by the mobile device, into or out of a driving mode of operation of the mobile device, wherein a duration of the wait period is based on the status of the connection between the mobile device and the wireless node, and wherein the duration of the wait period is greater when the status of the connection between the mobile device and the wireless node indicates that the connection remains active than when the status of the connection between the mobile device and the wireless node indicates that the connection is dropped.

2. The method of claim 1, wherein determining the second status of the mobile device as driven or not driven further comprises:

determining, by the mobile device and based on the sensor data, a value; and comparing, by the mobile device, the value to a threshold that is set based on the status of the connection.

3. The method of claim 1, wherein, if the sensor data indicates a walking motion:
the wait period is set at a first duration if the status of the connection indicates that the connection is dropped and walking continues, and
the wait period is set to a second duration if the status of the connection indicates that the connection remains active and walking continues, and wherein the first duration is shorter than the second duration.

4. The method of claim 3, wherein, if the sensor data indicates that the device is stationary and the status of the connection indicates that the connection is not dropped, the wait period is set at a third duration greater than both the first duration and the second duration.

5. The method of claim 1, wherein determining the second status of the mobile device includes lowering a threshold for a driven to not driven transition if the connection is inactive, and lowering a threshold for a not driven to driven transition if the connection is active.

6. A mobile electronic device comprising: one or more sensors; a network communications module that wirelessly connects the mobile electronic device to a wireless node; and a processor configured to: determine a first status of the mobile electronic device, the first status being one of driven or not driven, based on a status of a connection between the mobile device and the wireless node, wherein the sensor data generated by the one or more sensors includes one or more of accelerometer data, gyroscopic data and global positioning system data, and wherein the wireless node is a Bluetooth node, determine, based on a status of a wireless connection between the mobile electronic device and the wireless node and sensor data generated by the one or more sensors after the processor determines the first status, a second status of the mobile electronic device as driven or not drive, determine whether the second status of the mobile device is different from the first status of the mobile device, and responsive to determining that the second status is different from the first status and after a wait period, switch the mobile electronic device into or out of a driving mode of operation, wherein a duration of the wait period is based on the status of the connection between the mobile electronic device and the wireless node, and wherein the duration of the wait period is greater when the status of the connection between the mobile device and the wireless node indicates that the connection remains active than when the status of the connection between the mobile device and the wireless node indicates that the connection is dropped.

7. The mobile electronic device of claim 6, wherein the processor is further configured to determine the second status of the mobile device by at least deriving a value based on the sensor data and comparing the derived value to a threshold that is set based on the status of the connection.

8. The mobile electronic device of claim 6, wherein, if the sensor data indicates a walking motion, the processor sets the wait period to:
a first duration if the connection is dropped and walking continues; and
a second duration if the connection remains active and walking continues, and wherein the first period is shorter than the second period.

9. The mobile electronic device of claim 8, wherein, if the physical data indicates that the device is stationary and the connection is not dropped, the processor sets the wait period to a third duration greater than both the first duration and the second duration.

10. The mobile electronic device of claim 6, wherein the processor is configured to determine the second status of the mobile device by at least lowering a threshold for a driven to not driven transition if the connection is inactive, and lowering a threshold for a not driven to driven transition if the connection is active.

11. A non-transitory computer-readable storage medium encoded with instructions that, when executed, cause one or more processors of a mobile device to:

determine a first status of the mobile device, wherein the first status is one of driven or not driven;

collect sensor data generated by one or more sensors of the mobile device;

determine, based on a status of a connection between the mobile device and a wireless node and the sensor data, a second status of the mobile device as driven or not driven, wherein the sensor data includes one or more of accelerometer data, gyroscopic data and global positioning system data;

determine whether the second status of the mobile device is different from the first status of the mobile device; and responsive to determining that the second status of the mobile device is different from the first status of the mobile device and after a wait period has elapsed since determining that the second status of the mobile device is different from the first status of the mobile device, switch the mobile device into or out of operating in a driving mode of operation of the mobile device, wherein a duration of the wait period is based on the status of the connection between the mobile device and the wireless node, and wherein the duration of the wait period is greater when the status of the connection between the mobile device and the wireless node indicates that the connection remains active than when the status of the connection between the mobile device and the wireless node indicates that the connection is dropped.

12. The non-transitory computer-readable storage medium of claim 11, wherein the instructions further cause the one or more processors to:
   determine, based on the sensor data, a value; and
   compare the value to a threshold that is set based on the status of the connection.

13. The non-transitory computer-readable storage medium of claim 11,
   wherein, if the sensor data indicates a walking motion:
      the wait period is set at a first duration if the status of the connection indicates that the connection is dropped and walking continues, and
      the wait period is set to a second duration if the status of the connection indicates that the connection remains active and walking continues, and
   wherein the first duration is shorter than the second duration.

14. The non-transitory computer-readable storage medium of claim 13, wherein, if the sensor data indicates that the device is stationary and the status of the connection indicates that the connection is not dropped, the wait period is set at a third duration greater than both the first duration and the second duration.

15. The non-transitory computer-readable storage medium of claim 11, wherein the instructions further cause the one or more processors to:
   if the connection is inactive, lower a threshold for a driven to not driven transition; and
   if the connection is active, lower a threshold for a not driven to driven transition.

* * * * *